United States Patent Office 3,535,128
Patented Oct. 20, 1970

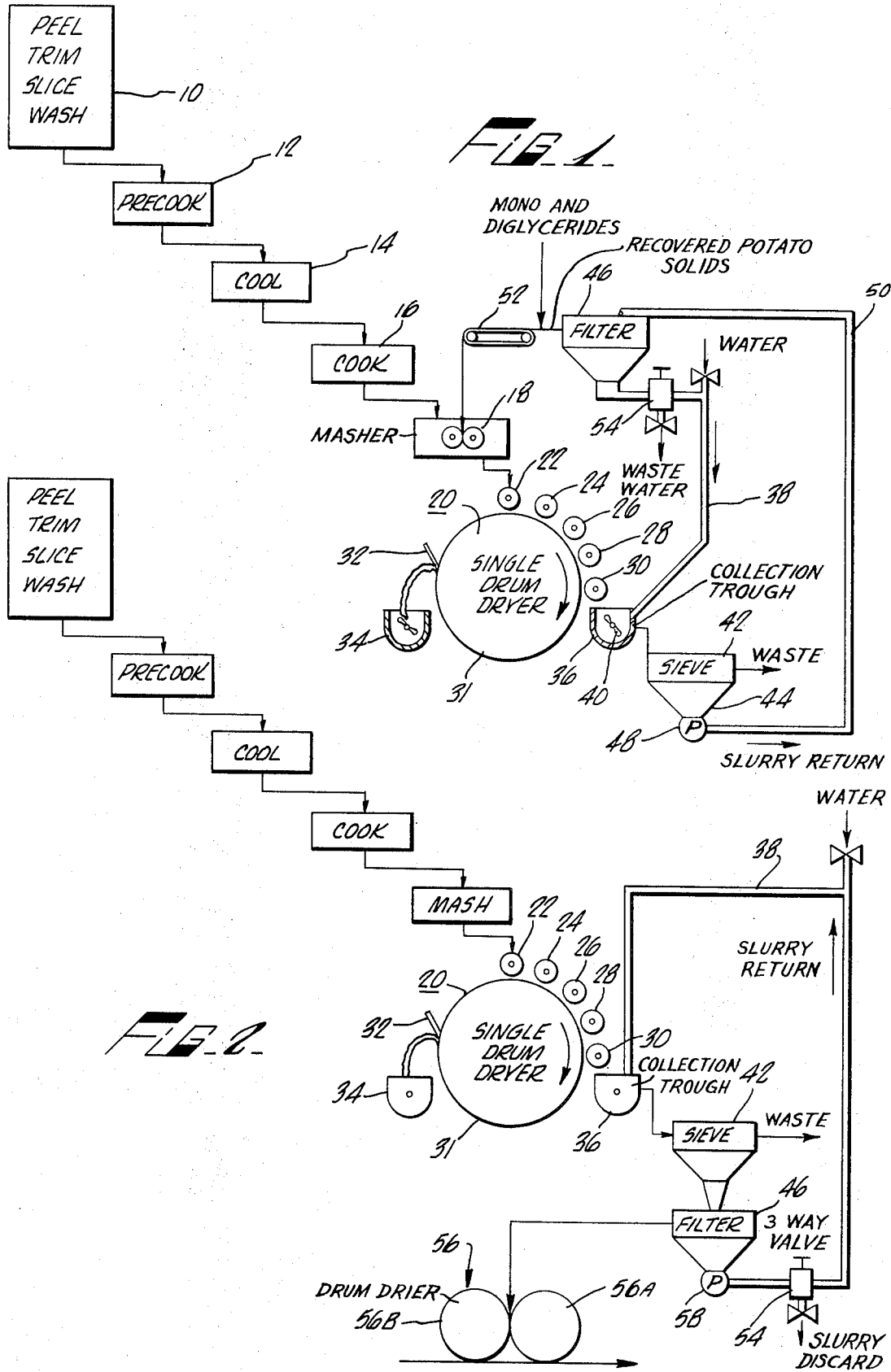

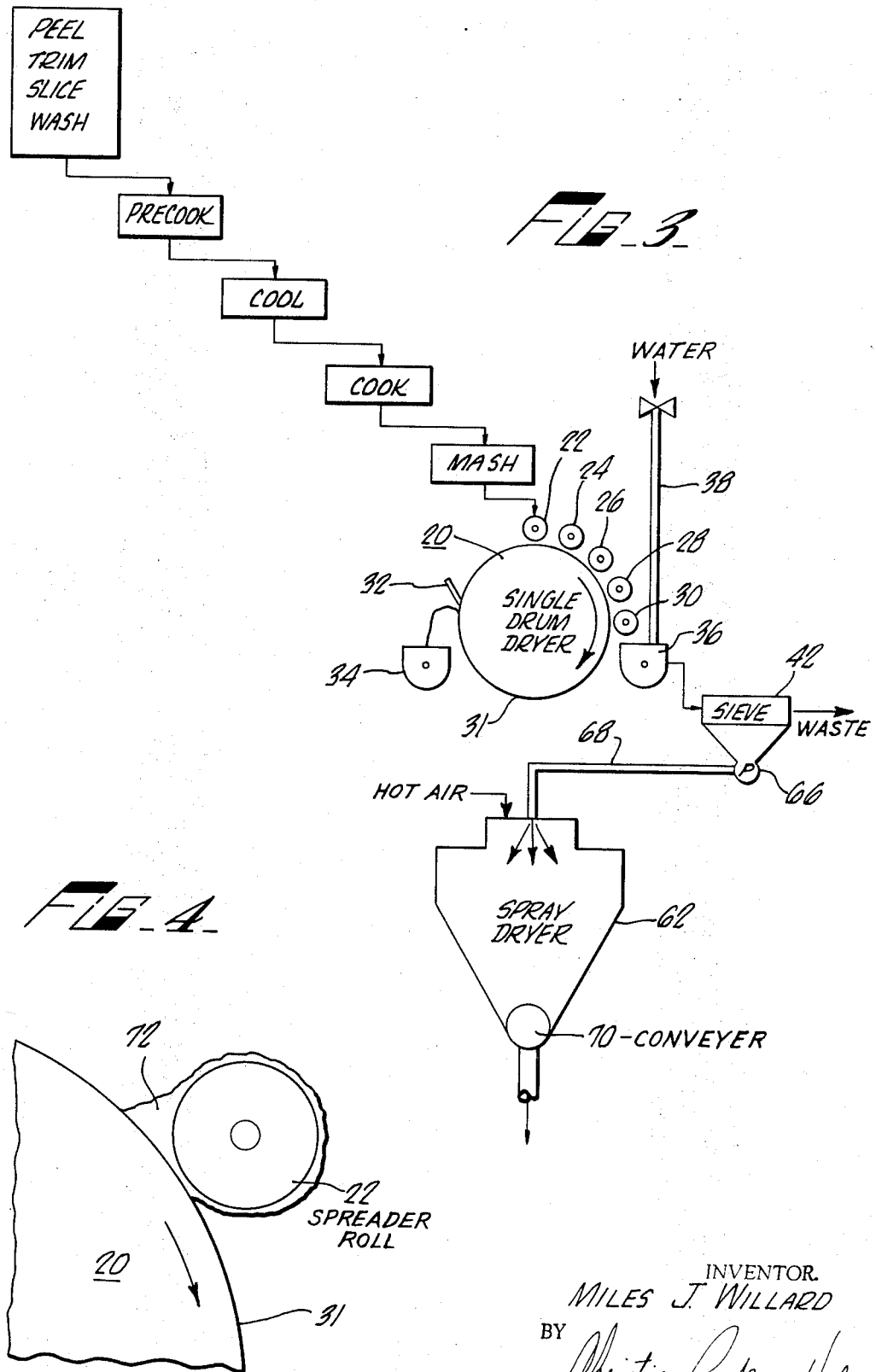

3,535,128
POTATO DEHYDRATION
Miles J. Willard, 3067 Gustafson Circle,
Idaho Falls, Idaho 83401
Filed Mar. 20, 1967, Ser. No. 624,515
Int. Cl. A23b 7/03
U.S. Cl. 99—207                                    18 Claims

ABSTRACT OF THE DISCLOSURE

Process for recovering edible mashed potato solids discarded together with waste in the dehydration of mashed potatoes and for dehydrating the recovered edible potato solids. Recovery apparatus having a collection trough for mixing the discarded potato solids with water to form a slurry and a screen segregating the waste material from the slurry. A pump or gravity conveys the slurry to a filter that separates the potato solids from the water. Pipes collect the water and return it to the trough or, alternatively, discard it. The potato solids are removed from the filter for subsequent mixing with the mashed potatoes to be dehydrated or for independent dehydration.

RELATED APPLICATIONS

The invention is related to and may be advantageously used in conjunction with my copending patent application bearing Ser. No. 403,050, filed Oct. 12, 1964 now U.S. Pat. No. 3,418,142.

BACKGROUND OF THE INVENTION

This invention relates to apparatus and process for dehydrating mashed potatoes and more particularly it relates to apparatus for reclaiming edible potato solids discarded as waste in the dehydration of mashed potatoes and for dehydrating such reclaimed potato solids. Although the present invention may advantageously be used in conjunction with a variety of dehydration devices, it is particularly well adapted for use with a dehydrating device which produces dehydrated mashed potatoes in flake form.

Many processes have been employed for the dehydration of mashed potatoes into a stable form that can readily be reconstituted by the consumer. In the past ten years, a process for drum-drying mashed potatoes into flakes has been developed. While this process has become commercially significant, it has certain disadvantages which make competition with other forms of dehydrating mashed potatoes difficult.

This particular process uses one or more spreader rolls whose first function is to deposit succeeding layers of mashed potatoes onto a hot drum to increase the thickness of the dried flakes that will later be removed from the drum. Thin flakes have a light bulk density, are expensive to package, and are therefore less desirable.

The spreader rolls are disposed around the periphery of the drum with their axes parallel to the axis of the drum to perform a second function. During the time the mashed potatoes stay on the spreader rolls, defective material such as skin particles, rot, corky tissue, etc. are progressively concentrated and transferred from an upper spreader roll toward the lower spreader rolls. In the past the material on the last roll was periodically removed by an operator with a scraper and was then discarded. Thus, the rolls serve as a separation device for removing undesirable portions of the potato from the mash prior to dehydration. Reference is made to my above-referred-to patent application for a more detailed description of this process and apparatus.

It has become apparent that potato flakes produced according to the prior art method briefly described above are at a competitive disadvantage compared to dehydrated mashed potatoes produced by other methods. The main reasons are that the above-described method entailed high labor costs caused by the fact that an operator must be present to control the spreader rolls and, as is frequently the case, must shovel the mash from the lower spreader rolls to the upper spreader rolls because the mash tends to drop from one roll to the next. Another and even more important problem is that the mashed potatoes held on the spreader rolls are extensively exposed to the heat from the drying drum. As the mash is transferred from the first spreader roll toward the last, an undesirable change in flavor and color of the mashed potatoes occurs, which is accentuated as the exposure time is increased. During storage of the dried product a change in flavor becomes increasingly apparent and makes the product less palatable. Portions of the mash remain on the spreader rolls for up to two hours before being deposited on the drying drum or before being finally discarded together with the waste.

Lastly, the removal of the accumulated waste material from the last spreader roll results in a loss of usable mashed potato solids. When the drum-dryer briefly described above is operated in a normal manner the loss of edible and potentially recoverable mashed potato solids average about 5% of the weight of potato solids fed into the dehydrating device. Holding the mash on the spreader rolls longer to effect a more complete removal of potato solids results in greater amounts of defective material being transferred to the drying drum. These waste materials detract from the quality of the finished product and require expensive hand-picking for their removal. Simultaneously, if the mash is held longer on the spreader rolls to reduce losses of edible potato solids, the flavor changes referred to above become more apparent, resulting in a shorter shelf life of the finished product and in a generally lesser quality.

Another consideration limits the length of time for which the potato mash may be held on the spreader rolls. Since the temperature of the mash on the spreader rolls is at or near the boiling point of water, cooking of the potatoes continues during this period. This weakens the cell structure of the potato cells and may in time lead to their rupture which would release undesirable gelatinized starch. When the dehydrated product is reconstituted the free starch makes the final product gummy and sticky and generally reduces the quality of its texture.

Alternatively, if the mash is held on the spreader rolls for a shorter period of time to avoid undesired flavor changes and high levels of defective parts in the dehydrated product, the discard ratio, which is the percentage of potato solids discarded by the device relative to the total quantity of potato solids fed into the dehydration device, may increase to as high as 10 or even 15%. This would render the entire process non-competitive and therefore non-usable.

SUMMARY OF THE INVENTION

The present invention comprises a collection means which receives the part of the mashed potatoes that has been discarded by the dehydration apparatus together with the waste. The discarded material is mixed with water in the collection means to form a slurry. The waste, such as rot and peels, is separated from the slurry. The potato solids left suspended in the slurry are dehydrated according to any one of several known methods including recirculating the solids through the dehydrating apparatus from which they were discarded.

The present invention overcomes the previously enumerated disadvantages of the conventional flake process. In addition, it provides advantages that make the flake process superior to all other methods for dehydrating mashed potatoes. For example, the mashed potatoes may be moved past the spreader rolls at an increased speed, which results in a shorter exposure of the potato mash to the high temperatures of the drum. The problems of overexposure to high temperature discoloration and flavor changes are thereby minimized.

Increasing the discard ratio to a point beyond the 3% to 5% that was present in the prior art would ordinarily result in an uneconomic process. However, by providing means for recovering the edible mashed potato solids from the discarded mashed potato product, the overall recovery of the process is higher. A reduction in labor cost will result by using automatic roll scrapers to advance the mash at the desired rate from roll to roll rather than the present manual operation described previously.

Perhaps most important, the present invention permits a more versatile manufacturing process. Whereas in the prior art the flaking process resulted in a homogeneous final product, the present invention permits a manufacturer to produce simultaneously a number of products of varying quality. For example, the potato substances recovered by the present invention may be dehydrated into a dehydrated product such as potato flour which is frequently used as an ingredient for bread, cake and dry soup mixes. Since broken cells, gelatinized starch, and stickiness of the reconstituted product is of little consequence in such uses, this secondary product produced as a result of this invention may be made with less care than dehydrated mashed potatoes that are to be reconstituted into mashed potatoes, and is therefore more economical and less expensive. Or, a manufacturer desiring to produce both potato flakes and potato granules, may spray-dry the potato solids reclaimed by the present invention to obtain a certain percentage of his output in granules and the rest in flakes.

BRIEF DESCRIPTION OF THE DRAWINGS

FIG. 1 is a schematic flow sheet of the process of this invention and shows a preferred embodiment whereby the mashed potato solids recovered are returned to the dehydrating apparatus from which they were originally discarded;

FIG. 2 is a schematic flow sheet of a second preferred embodiment of this invention wherein the potato solids reclaimed after they have been discarded by the dehydration apparatus are dehydrated by an independent drum-dryer;

FIG. 3 is a schematic flow sheet of a third preferred embodiment of this invention wherein the potato solids that have been discarded by the dehydration apparatus are diluted and atomized in a spray-dryer to produce unicellular dehydrated mashed potato granules; and FIG. 4 is a fragmentary side elevation of a drying drum and spreader roll showing the flow of mashed potatoes on a single drum-dryer.

DESCRIPTION OF THE PREFERRED EMBODIMENT

As shown in FIGS. 1 through 3, the raw potatoes to be dehydrated are conventionally peeled, trimmed to remove objectionable rotted portions, sliced to a thickness of between one-half and three-quarters of an inch, and washed to remove surface starch freed by the slicing, at 10. The sliced potatoes are then pre-cooked in water at a temperature between 155° F. and 175° F. for about twenty minutes in a precooker 12. To modify the gelatinized starch within the potato cells and produce a less sticky finished product, the precooked potatoes are cooled to about 60° F. at 14, which is most conveniently done in running tap water. The cooled slices are cooked in a cooker 16 for a period of time which varies with the amount of solids in the potatoes and the variety of the potatoes, but which is normally within twenty to forty minutes. Thereafter, the cooked potatoes are mashed, which is most conveniently done between one-half inch diameter rods 18 spaced three-eighths inch apart.

At this point additives, for example emulsifiers such as mono and diglycerides, sodium acid pyrophosphate, and various antioxidants, such as sodium bisulfite, BHA and BHT, are added to the mashed potatoes to improve their texture and shelf life characteristics. The mashed potatoes are then deposited onto the feed point of a conventional single drum-dryer 20. The drum-dryer is shown equipped with five spreader rolls 22, 24, 26, 28 and 30 that are mounted adjacent a drying drum 31 to rotate about horizontal axes parallel to that of the drying drum. The drying drum is of conventional construction, and is conventionally heated, such as with steam, to a surface temperature of between 250° F. and 350° F.

The cooked mashed potatoes are deposited in a thin film or layer on the exterior surface of the drying drum 31 and another layer on the exterior surface of the first spreader roll 22. Mashed potatoes pass between the first spreader roll and the drying drum and are picked up by the second spreader roll 24 that is mounted adjacent and below the first spreader roll. Another layer of mashed potatoes accumulates around the second spreader roll. Mashed potatoes pass between the second spreader roll and the drying drum and form a layer of mashed potatoes around the third spreader roll 26, which is mounted adjacent the drying drum and below the second spreader roll. Spreader rolls 28 and 30 are similarly mounted and are successively lower. If the consistency of the mashed potatoes is such that they do not automatically accumulate on the second, third, and fourth spreader rolls to the extent required, conventional scrapers (not shown) are intermittently applied to the rolls to transfer the necessary amount of mash from the upper to the lower rolls.

A conventional, elongated, horizontal doctor knife 32 is located adjacent the drum 20, at a location approximately 180° from the fifth spreader roll 30, and scrapes the dried mashed potatoes from the drying drum. The potatoes then fall into a product conveyor 34 where they may be broken up and carried to a packaging station (not shown).

As the dryer-drum moves under the spreader rolls, each roll deposits a succeeding layer of mashed potatoes onto the drum to build up a thick layer which is dried as it moves around the drum and is removed by the doctor knife. Defective material or waste, such as particles of skin, rot, corky tissue, etc., are progressively concentrated and transferred from the first roll to the last from which they are then discarded as a fraction enriched with waste In the conventional process about 3 to 5% of the mash fed onto the dryer at the feeding point and containing much of the defective portions of the potato not removed by trimming is discharged from the last roll 30 and discarded.

The fraction of discarded waste material together with the discarded palatable potato substances are collected in a collection trough 36, Water is added to the collection trough from a tube or pipe 38 and the discarded materails are gently mixed with the water. Preferably the mixing is done by a conventional paddle mixer or screw 40. Sufficient water is added to the discarded materials to form a slurry containing about 10 to about 16% potato solids. The slurry containing edible potato solids, potato waste materials, and water is fed to a standard sieving apparatus 42, which may be a vibrating horizontal screen, a cylindrical screen fitted with an internally rotating brush or paddle, or a combination of these. Any one of them is well known in the food industry for separating firm particles such as skin or seeds from pulped fruit or vegetable products.

Care is exercised in the sieving operation not to damage unduly the cell structure of the palatable potato solids when they pass through the sieve screen. For example, if a cylindrical sieve is fitted with a rotating paddle, the speed of the paddle must not be excessive. The sieve is provided with openings of sufficient size to permit the potato cells to pass through them easily. Otherwise, cell damage may occur which frees gelatinized starch and reduces the quality of the final dehydrated product. At the same time, of course, the sieve openings are not so large as to permit potato waste material to pass therethrough. Practice has shown that the best results are achieved with a sieve provided with openings of about .045 in. and with a paddle that rotates at a speed of approximately 50 revolutions per minute whereby a clearance of at least one-eighth inch is maintained between the walls of the sieve and the paddle.

If the production output is large, it is desirable to have a two-stage sieve. Most conveniently, the first stage of the sieve is a vibrating screen provided with relatively large openings that segregate the larger waste particles from the slurry, and the second stage is a cylindrical sieve to remove the fine waste particles. In this instance, the peeling of raw potatoes is drastically reduced or, in extreme cases, it is eliminated altogether. The first stage of the sieve thus removes the greater portion of the waste particles.

With the waste materials removed by the sieve, a uniform white potato slurry is collected in a trough 44 located beneath the sieve 42. The subsequent treatment of the potato slurry may follow any one of several methods. The method selected is determined by which is most convenient under the particular circumstances. There are presently three preferred methods of further treating the potato slurry, and they are hereinafter designated the first, the second and the third preferred embodiment of the invention.

In the first preferred embodiment of this invention the potato slurry collected underneath the sieve 42 is conveyed to a filter 46. The transfer is accomplished either by using a pump 48 or by positioning the sieve such that the slurry is transported to the sieve by gravity. Although there are relatively low speed pumps available on the market which will not damage the potato cells to a great extent, from the point of desired quality of the end product, it is advisable to eliminate the pump if possible. If a pump must be used, the filter is connected to the pump by suitable pipes 50 wherein the slurry is conveyed to the filter.

The filter separates the potato solids contained in the slurry from the water and may be any one of many commercially available filters, such as a horizontal or a rotary vacuum filter for example. The resulting recovered potato solids should contain about 80% to 82% water to conform them to the approximate water content of the mashed potatoes fed onto the drum-dryer. Any convenient means such as a conveyor 52 may be used to transport the recovered potato solids from the filter 46 to the feed point on top of the drum-dryer 20, such that the potato solids are reintroduced into the dehydration process.

The water removed by the filter is either reused for diluting discarded mash in the collection trough 36, discharged from the system, or portions of it combined with fresh water. Whether or not the filtered water is discarded depends on its condition. If the water contains a substantial bacterial population or a relatively large quantity of dissolved potato solids, sugar, or free starch, it should be discarded to enhance the quality of the final product. Otherwise, it may be added to the water for diluting discarded mash. Accordingly, a three-way control valve 54 is disposed between the filter and the water pipe 38 leading to the collection trough so the filtrate may selectively be discarded or added to the water in pipe 38.

The second preferred embodiment of this invention, shown in FIG. 2, is substantially similar to the first embodiment but distinguishes itself from the first embodiment in that the filtered potato mix is fed into a double drum-dryer 56. A pair of drums 56A and 56B rotate and are heated similarly to drum 31 of the single drum-dryer 20, and the recovered potato solids are introduced into the gap between the rotating drums. The potato solids are spread over the surface of the drums in a thin layer. They rotate with the drums approximately 180° and are removed from the surface of the drums by conventional doctor knives (not shown). The dehydrated product is then transported to conventional breaking and packaging equipment (not shown).

This embodiment of the invention is particularly useful in the manufacture of potato flour or ingredient potato flakes. In either case, the absence of damaged potato cells and free starch is of secondary importance since the product will be used as a filler and is not directly consumed as are, for example, reconstituted mashed potatoes. Although the double drum-dryer tends to produce a flake which is too thin for use as a standard potato flake, it is economical in operation because a large throughput with little or no labor is possible.

To obtain potato flour, the flakes dehydrated by the double drum-dryer 56 are subsequently ground to a fine powder. Ingredient potato flakes are used for bakery products and as the potato ingredient in fish cakes, and may be obtained from the double drum-dryer without further processing.

In the second preferred embodiment shown in FIG. 2, the filter 46 is arranged relative to the sieve 42 such that the potato slurry is conveyed from the sieve to the filter by gravity, thereby avoiding the necessity of having to use a pump to transfer the slurry to the filter. A pump 58 is shown connected to the filter 46 to remove the water freed in the filter. In a manner similar to the manner in the first preferred embodiment of this invention, the water may either be returned to the collection trough 36 or it may be discarded, or part of it may be returned and part of it may be discarded. To control the disposition of the water freed in the filter, a three-way valve 60 is located intermediate the filter and the collection trough.

In the third embodiment of this invention, shown in FIG. 3, the potato slurry formed in the collection trough 36 is likewise segregated from the potato waste material on the sieve 42. Thereafter, the potato slurry containing potato solids and water only is not dewatered, as in the first and second embodiments of the invention, but is conveyed to a spray dryer 62 where the potato solids are dehydrated.

The dryer contains one or more pressure nozzles 64 that are of a conventional and well known design, or a rotating cup diffuser (not shown). A pump 66 feeds the slurry through suitable pipes 68 to the nozzle and receives the slurry from sieve 42. The dryer is of a conventional design and preferably contains hot air into which the slurry is diffused. The potato solids are thereby atomized into substantially unicellular particles that are dehydrated in the hot air contained in the dryer and are collected at the bottom of the dryer in a product conveyor 70. These dehydrated potato granules are then transported to the point (not shown) where they are packaged.

This third embodiment of the invention has the advantage over the other two embodiments of not requiring a separate filter to dewater the slurry. It has the additional advantage of permitting a manufacturer to obtain two different kinds of dehydrated mashed potatoes, namely, a potato flake obtained on the single drum-dryer 20 and potato granules obtained in the spray-dryer 62. Since the slurry, that is, the water together with the potato solids, is diffused into the spray-dryer, no water is returned to the collection trough 36 as is the case in the other two embodiments. The water used for slurrying the discarded potato solids and potato waste in the collection trough is therefore always fresh water introduced into the collection trough by the pipe 38.

In operation of the three embodiments described above, any desired discard ratio is possible. An obvious possibility is to operate the single drum-dryer with its spreader rolls according to the prior art method whereby the discard ratio is around 3 to 5%. In this case, the advantage of the present invention lies in the ultimate recovery of the mashed potato solids that would have been lost under the prior art.

If the second embodiment of this invention, utilizing the double drum-dryer 56, is used, one double drum-dryer may be operated to serve several single drum-dryers to recover the discarded potato solids. Likewise, in case the third embodiment of this invention is employed, a single spray-dryer may serve one or more single drum-dryers. If the potato slurry is returned to the potato mash to be dehydrated by the single drum-dryer, then of course each single drum-dryer recovers and dehydrates the potato solids previously discarded by it only.

To obtain the maximum advantage of the invention and get an improved flavor and to avoid discoloration of the potato flakes produced on the single drum-dryer 20, it is desirable to retain the mash on the spreader rolls for a period of time which is shorter than it was under the prior art. This is done by increasing the discard ratio. Optimum results were achieved with a discard ratio of 25% with the first embodiment, of 5 to 10% with the second embodiment, and of up to approximately 50% with the third embodiment of this invention. The exact discard ratio, which is determinable as shown below, depends on other factors, such as the intended use of the secondary product which dictates the quality as well as the quantity of the dehydrated potato solids that are to be discarded on the single drum-dryer.

The retention time of mashed potatoes on the spreader rolls of a single drum-dryer is a function of the amount of mashed potatoes withdrawn from the last spreader roll 30. Given a desired discard ratio, the retention time is calculated as follows:

The total amount of mash retained on the drum-dryer is calculated from the clearance between the spreader rolls and the drum surface and the amount of mash held in pocket 72 defined by the adjacent upper surfaces 31 of the drum 20 and the spreader roll 30 (see FIG. 4). For an average drying drum having a diameter of, say, five feet, a length of, say 16 feet, with five spreader rolls of a diameter of 8.5 inches, and with each spreader roll surface seated one-quarter inch from the drum surface, the retention of mash at any one time on the drum-dryer is approximately 160 pounds, using a density of mashed potatoes of 60 pounds per cubic foot. The mash is distributed as follows: 135 pounds in the pockets 72 and 25 pounds in the ¼" layers encircling the spreader rolls. Under typical operating conditions, producing about 800 pounds of potato flakes per hour at 6% moisture and with a 3% discard ratio, the theoretical quantity of mashed potatoes fed to the dryer and containing 21% potato solids is 3,700 pounds an hour, whereby approximately 110 pounds of mash per hour are discarded from the spreader roll. The average retention time of the mash on the spreader rolls is about three minutes (160 pounds divided by 3,700 pounds per hour). However, while portions of the potato mash remain on the spreader rolls for less than the three minutes, part of the potato mash remains on the spreader rolls for a longer period of time. At a 3% discard ratio some potato particles remain on the rolls up to about 85 minutes (160 pounds divided by 110 pounds of mash per hour). It is these portions of the mash that are exposed to heat over long periods of time and therefore suffer extensive heat damage and contaminate the final product. Although not all of the final dehydrated mashed potatoes experience heat damage, the part that does substantially reduces the quality of the final product.

The following table shows the effect of increasing the mash discard ratio from 3% to 50%. In the residence time column of the table, the time given is the maximum time potato particles have been found to remain on the spreader rolls.

| Discard ratio (percent): | Residence time of mash on spreader rolls in minutes |
| --- | --- |
| 3 | 85 |
| 5 | 51 |
| 10 | 25 |
| 20 | 11 |
| 30 | 8 |
| 40 | 4 |
| 50 | 2.5 |

As already briefly alluded to, this invention permits further time-saving and economizing alterations in a potato dehydration process such as, for example, described in my copending patent application referred to above. The peeling and trimming operation to prepare the raw potatoes for cooking, mashing, etc. may substantially be curtailed or possibly eliminated altogether since the relatively rapid movement of the mashed potatoes from the first to the last spreader rolls permits these potato waste particles to be collected in the collection trough 36 without being deposited on the surface of the drying drum 31. They can thereafter be separated from the palatable potato solids as earlier described. The elimination of the trimming process is highly desirable because it is a non-mechanized process where large eyes and extensively rotted portions of the potatoes are manually removed. This relatively expensive operation is substantially curtailed or eliminated by virtue of this invention.

The following example further illustrates the present invention and will aid in its understanding.

EXAMPLE I

Idaho russet potatoes of a processor grade were converted into mashed potatoes ready for processing by first peeling them in steam at a pressure of 90 pounds per square inch, washing the peeled potatoes to remove the peels, trimming the defective portions of the potato, and slicing the peeled and trimmed potatoes into slices of one-half inch thickness. The potatoes were thereafter washed to remove free starch and precooked at a temperature of 160° F. for twenty minutes. They were cooled in tap water for approximately twenty minutes to modify the starch structure, whereby the internal temperature of the potatoes fell to 70° F. The precooked and cooled potatoes were finish-cooked for thirty minutes in steam at a temperature of 204° F. and, immediately following the final cooking, were mashed through smooth one-half inch diameter cylindrical rods spaced three-eighths inch apart. At this point, chemical additives were added and they were present in the final dehydrated mashed potatoes in the following amounts:

Monoglyceride emulsifier (Myverol 18–07)—.5%
Sodium acid pyrophosphate—.1%
Sulfur dioxide (from sodium bisulfite)—250 p.p.m.
BHA—50 p.p.m.

This mash was combined with filtered and recovered potato mix in the quantities shown below, and was drum-dried at a steam pressure of 125 pounds per square inch (350° F.) and at a drum speed of 3 r.p.m. to obtain potato flakes with a final moisture content of 6%.

Automatic roll scrapers were timed to discharge 20% of the mash fed to the drum into the collection trough where the discharged mash was combined with water and mixed by a rotating screw that simultaneously conveyed the mixture out of the trough. The added water was a mixture of one-half fresh water and one-half filtrate water recovered at the filter. The slurry obtained in the collection trough contained 12.5% potato solids. It was then passed through a cylindrical sieve provided with .045 inch openings in which a standard paddle rotated at 50 r.p.m. The paddle blades were set one-eighth inch away from the inside surface of the screen. The potato waste materials were screened and discarded and the slurry, now containing water and potato solids, was conveyed to a continuous rotary vacuum filter operating at a vaccum of 15 inches mercury to yield a potato solids mix of a thickness of about one-quarter of an inch and a solids content of 18%. A screw conveyed the potato solids mix to where it was discharged onto and mixed with the potato mash flowing toward the drum-dryer. One-half of the filtrate water was discarded, the remainder was mixed with an equal amount of fresh water and used for subsequent dilution of the discarded potato mash in the collection trough. The overall recovery of potato solids amounted to 98% of the potato solids fed to the drum-dryer.

The quality of the finished potato flakes obtained on the single drum-dryer was superior in every respect to flakes made from the same raw material by standard procedures as practiced in the past. The quality differential was especially apparent after the obtained mashed potato flakes had been stored for nine months at room temperature. Flakes produced according to the conventional flaking method showed distinct oxidative rancidity type flavors. The taste of potato flakes produced according to this invention after they had been stored for nine months was practically indistinguishable from the taste of freshly produced potato flakes.

What is claimed is:

1. Apparatus for improving the quality of product from a mashed potato dehydrator which dries a mixture of potato solids and waste, the apparatus comprising means for increasing the amount of waste in a fraction of the potato solids from the dehydrator, means for separating the fraction of potato solids and waste from the rest of the potato solids, collection means for collecting the fraction of potato solids and waste from the dehydrator after the fraction has been at least partially dehydrated, means for adding water to the fraction to form a slurry including waste and potato solids, a screen receiving the slurry from the collection means for segregating the waste from the slurry, a filter receiving the slurry from the screen for removing the water from the slurry to obtain a thickened slurry containing from about 18% to about 20% potato solids, heated means separate from the dehydrator for dehydrating the thickened slurry, and means for conveying the thickened slurry from the filter to the heated means.

2. Apparatus according to claim 1 wherein the means for mixing the mixture include a rotating screw disposed in the collection means.

3. Apparatus according to claim 1 wherein the filter is disposed relative to the screen such that the slurry is conveyed from the screen to the filter by gravitational forces.

4. Apparatus according to claim 3 including a conduit for returning the water removed by the filter to the collection means, means for conveying the water in the conduit, and means for selectively reducing the flow of said water to the collection means and for discharging the excess water.

5. Apparatus for improving the quality of product from a mashed potato dehydrator which dries a mixture of potato solids and waste, the apparatus comprising means for increasing the amount of waste in a fraction of the potato solids from the dehydrator with waste, means for separating the fraction of potato solids and waste from the rest of the potato solids, collection means for collecting the fraction of potato solids and waste after the fraction has been at least partially dehydrated by the dehydrator and for adding water to form a slurry, means for mixing the fraction and the water, a screen receiving the slurry from the collection means for segregating the waste from the slurry, a dryer containing a heating medium of a temperature between 350° F. and 450° F., means for conveying the slurry from the screen to the dryer, and means for dispersing the slurry in the dryer to obtain dehydrated potato particles.

6. Apparatus for dehydrating cooked mashed potatoes comprising a rotatable heating drying drum, a rotatable spreader roll adjacent the drum for depositing a layer of the potatoes on the drum and for discarding a portion of the potatoes together with non-palatable potato waste, and means for supplying the drum and the roll with potatoes, wherein the improvement comprises a collection means adjacent the spreader roll for receiving the discarded portions and for adding water to form a slurry including waste and potato solids, a separating screen for segregating the waste from the slurry, means for conveying the slurry from the collection means to the screen, and means for dehydrating the potato slurry.

7. Apparatus according to claim 6 wherein the means for dehydrating the potato slurry include a filter for removing water from the slurry, means for conveying the slurry from the screen to the filter, a heated rotatable drum, means for spreading the dewatered slurry onto the rotatable drum, and means for removing the dehydrated potato solids from the rotatable drum.

8. Apparatus according to claim 6 wherein the means for dehydrating the potato slurry include a dryer containing a heat transfer medium of a temperature between 350° and 450° F., means for conveying the slurry from the screen to the dryer, and means for diffusing the slurry in the dryer to obtain dehydrated potato particles.

9. Apparatus according to claim 6 including a rotating screw disposed in the collection means for mixing the discarded potatoes and waste with water and for conveying the slurry from the collection means to the screen.

10. Apparatus according to claim 6 wherein the means for dehydrating the potato slurry include a filter for removing water from the slurry, means for conveying the slurry from the screen to the filter, and means for introducing the dewatered slurry onto the heated drum.

11. Apparatus according to claim 10 including a conduit for conveying the extracted water from the filter to the collection means, and means for selectively reducing the water flow in the conduit and for discharging the excess water.

12. A process for improving the quality of a dehydrated mashed potato product, the process comprising the steps of collecting a mixture of potato solids and waste discarded during dehydration of the mashed potatoes, increasing the concentration of waste in a fraction of the mixture, separating the fraction from the remainder of the mixture, adding water to the fraction to form a slurry including potato solids and waste, segregating the waste from the slurry, and dehydrating the potato solids contained in the slurry.

13. In a process for dehydrating cooked, mashed potatoes, which includes the steps of spreading the potatoes onto the heated surface of a drying drum with a spreader roll, storing a supply of mashed potatoes including nonpalatable potato waste on the spreader roll for subsequent spreading onto the drum, and discarding portions of potato solids and waste from the spreader roll, the improvement comprising the steps of collecting the discarded potato solids and waste, adding water to obtain a slurry including potato solids and waste, segregating the waste from the slurry, and dehydrating the potato solids contained in the slurry, whereby the drum and the roll are adjusted such that the roll discards from between 5% to 50% of potato solids fed to the drum.

14. A process as claimed in claim 13 wherin the potato solids are dehydrated by removing water from the slurry to obtain a slurry containing about 18% to about 20% potato solids and by adding the dewatered slurry to the mashed potatoes to be dehydrated.

15. A process as claimed in claim 13 wherein the potato solids are dehydrated by removing water from the slurry, spreading the dewatered slurry on a heated, rotatable drum, and removing the dehydrated potato solids from the drum.

16. A process as claimed in claim 13 wherein the potato solids are dehydrated by conveying the slurry to a dryer and diffusing the slurry into a hot medium contained in the dryer.

17. Apparatus for improving the quality of a product from a mashed potato dehydrator which dries a mixture of water, potato solids and waste including skin particles, rot, corky tissue and the like, the apparatus comprising means for removing some water from the mixture, means for increasing the amount of waste with adhering potato solids in a fraction of the dewatered mixture, a collection station for gathering the fraction, means for adding water to the collected fraction to slurry the fraction, means for separating waste from the adhering potato solids and for discarding the waste material, and means for returning the separated potato solids to the dehydrator.

18. Apparatus according to claim 17 wherein the means for dehydrating include means for dewatering the slurry of potato solids and a conduit between the dewatering means and the collection means to return the water removed from the slurry to the collecting means.

References Cited

UNITED STATES PATENTS

| | | | |
|---|---|---|---|
| 2,490,431 | 12/1949 | Greene et al. | 99—207 |
| 3,220,857 | 11/1965 | Hollis et al. | 99—207 |
| 3,264,753 | 8/1966 | Budzien | 159—10 X |
| 3,136,643 | 6/1964 | Reeves | 99—207 |
| 3,261,695 | 6/1966 | Sienkiewicz et al. | 99—207 |

FOREIGN PATENTS 482,997   4/1938   Great Britain.

NORMAN YUDKOFF, Primary Examiner

J. SOFER, Assistant Examiner

U.S. Cl. X.R.

99—246; 159—11